(12) United States Patent
Fecamp et al.

(10) Patent No.: US 8,678,814 B2
(45) Date of Patent: Mar. 25, 2014

(54) CONTROL SYSTEM OF AN INTERNAL COMBUSTION ENGINE

(75) Inventors: Benoit Fecamp, Florence (IT); Ever Avriel Fadlun, Rome (IT); Stefano Groppi, Monsummano Terme (IT)

(73) Assignee: General Electric Company, Schenectady, NY (US)

( * ) Notice: Subject to any disclaimer, the term of this patent is extended or adjusted under 35 U.S.C. 154(b) by 1177 days.

(21) Appl. No.: 10/576,786

(22) PCT Filed: Oct. 28, 2004

(86) PCT No.: PCT/EP2004/012253
§ 371 (c)(1),
(2), (4) Date: Apr. 21, 2006

(87) PCT Pub. No.: WO2005/049989
PCT Pub. Date: Jun. 2, 2005

(65) Prior Publication Data
US 2007/0028591 A1    Feb. 8, 2007

(51) Int. Cl.
*F02C 9/50* (2006.01)
*F02C 7/22* (2006.01)

(52) U.S. Cl.
USPC ...... 431/75; 431/12; 431/7; 431/11; 431/170; 60/277; 60/723; 60/39.281; 60/39.27

(58) Field of Classification Search
USPC ............ 431/12, 75, 7; 60/39.27, 39.281, 273
See application file for complete search history.

(56) References Cited

U.S. PATENT DOCUMENTS

| | | | |
|---|---|---|---|
| 5,428,956 A * | 7/1995 | Maus et al. | 60/277 |
| 5,600,948 A * | 2/1997 | Nakajima et al. | 60/276 |
| 5,713,339 A | 2/1998 | Kishida et al. | |
| 6,095,793 A * | 8/2000 | Greeb | 431/12 |
| 6,109,018 A * | 8/2000 | Rostrup-Nielsen et al. | 60/777 |
| 6,119,448 A * | 9/2000 | Emmerling et al. | 60/274 |
| 6,286,305 B1 * | 9/2001 | Poublon et al. | 60/285 |

(Continued)

FOREIGN PATENT DOCUMENTS

| | | |
|---|---|---|
| CN | 1140793 A | 1/1997 |
| DE | 3306484 A | 11/1983 |

(Continued)

OTHER PUBLICATIONS

Written Opinion for PCT/EP2004/012253 mailed Jan. 25, 2005.

(Continued)

*Primary Examiner* — Steven B McAllister
*Assistant Examiner* — Nikhil Mashruwala
(74) *Attorney, Agent, or Firm* — Global Patent Operation

(57) ABSTRACT

Control and regulation system of a combustion unit (10) of the type comprising a combustion chamber (11) and a catalyst (40), the control and regulation system comprising: -an acquisition device of signals proportional to functioning parameters characteristic of the functioning state of the combustion unit (10), an electronic data processing unit (30) connected to the signal acquisition device from which it receives signals, a control and regulation program associated with said electronic data processing unit (30), a first fuel distribution valve (20), a second air distribution valve (21), a data base associated with said electronic data processing unit (30), the electronic data processing unit (30) receives signals from the signal acquisition device, processes them and regulates the opening of the first valve (20) and second valve (21) to minimize the polluting emissions of CO and Nox of the combustion unit (10).

16 Claims, 1 Drawing Sheet

(56) References Cited

U.S. PATENT DOCUMENTS

| | | | |
|---|---|---|---|
| 6,325,046 B1 * | 12/2001 | Kanno | 123/406.44 |
| 6,658,856 B2 * | 12/2003 | Critchley | 60/777 |
| 6,945,034 B2 * | 9/2005 | Ueno et al. | 60/288 |
| 7,121,085 B2 * | 10/2006 | van Nieuwstadt | 60/286 |
| 2003/0134240 A1 | 7/2003 | Critchley | |

FOREIGN PATENT DOCUMENTS

| | | | |
|---|---|---|---|
| EP | 1418318 A | 5/2004 | |
| JP | 63-123925 A | 5/1988 | |
| JP | 4-37845 U | 3/1992 | |
| WO | 03/021150 A2 | 3/2003 | |

OTHER PUBLICATIONS

International Search Report for PCT/EP2004/012253 mailed Jan. 25, 2005.

Unofficial English translation of CN Office Action dated Jan. 4, 2008 from corresponding CN Application No. 200480032192.9.

KR Office Action dated Jun. 13, 2011 from corresponding KR Application No. 2006-7008219.

* cited by examiner

CONTROL SYSTEM OF AN INTERNAL COMBUSTION ENGINE

BACKGROUND

1. Technical Field

The present invention relates to a control and regulation system of a combustion unit equipped with a catalyst, in particular for controlling and regulating the functioning of the catalyst in order to reduce polluting emissions and increase the life of the catalyst.

2. Discussion of the Background

A combustion unit normally comprises a first combustion chamber, a catalyst and a second combustion chamber.

The combustion chamber also includes an inlet duct for fuel, a second inlet duct for the compressed air coming from a compressor and a third outlet duct of the exhaust fumes.

The catalyst functions correctly and therefore allows lows the abatement of polluting emissions such as CO and NOx, when its functioning temperature is within a pre-established temperature range, typical for its correct functioning.

For operating temperatures that do not fall within this temperature range, on the other hand, the catalyst does not function correctly and does not adequately reduce the CO and NOx polluting emissions.

One of the disadvantages is that with current catalyst combustion units, the abatement of polluting substances is not guaranteed, as the catalyst may have a functioning temperature that does not fall within the typical temperature range for its correct functioning.

Another drawback is that with present catalyst combustion units, if said catalyst functions at temperatures lower than those of the typical temperature range, it could become polluted, necessitating its early substitution.

Another disadvantage is that with the catalyst combustion units currently used, if these function at temperatures higher than those included within the range typical for the correct functioning of the catalyst, said catalyst deteriorates and ages more rapidly, thus having a shorter useful life.

Yet another drawback is that it is not possible to have a correct functioning temperature of the catalyst with variations in the environmental conditions, such as, for example, the temperature, pressure and humidity of the air.

SUMMARY

An objective of the present invention is to provide a control and regulation system of a combustion unit capable of minimizing polluting emissions also with variations in the environmental conditions, such as the temperature, pressure and humidity of the air.

A further objective is to provide a control and regulation system of a combustion unit wherein the functioning temperature of the catalyst is always within the typical range for its correct functioning.

These objectives according to the present invention are achieved by means of a control and regulation system of a combustion unit which, through the detection and processing of characteristic functioning parameters of the combustion unit itself, regulates it so as to reduce CO and NOx polluting emissions to the minimum.

An aspect of the present invention relates to a control and regulation system of a combustion unit (10) of the type comprising a combustion chamber (11) and a catalyst (40), said control and regulation system comprising:

an acquisition device of signals proportional to functioning parameters characteristic of the functioning state of the combustion unit (10), an electronic data processing unit (30) connected to the signal acquisition device from which it receives signals, a control and regulation program associated with said electronic data processing unit (30), a first fuel distribution valve (20), a second combustion air regulation valve (21), a data base associated with said electronic data processing unit (30), said electronic data processing unit (30) receives signals from the signal acquisition device, processes them and regulates the opening of the first valve (20) and second valve (21) to minimize the polluting emissions of CO and NOx of the combustion unit (10).

BRIEF DESCRIPTION OF THE DRAWINGS

The characteristics and advantages of a control and regulation system of a combustion unit according to the present invention will appear more evident from the following illustrative and non-limiting description, referring to the enclosed schematic drawings in which.

DETAILED DESCRIPTION

Figure 1:
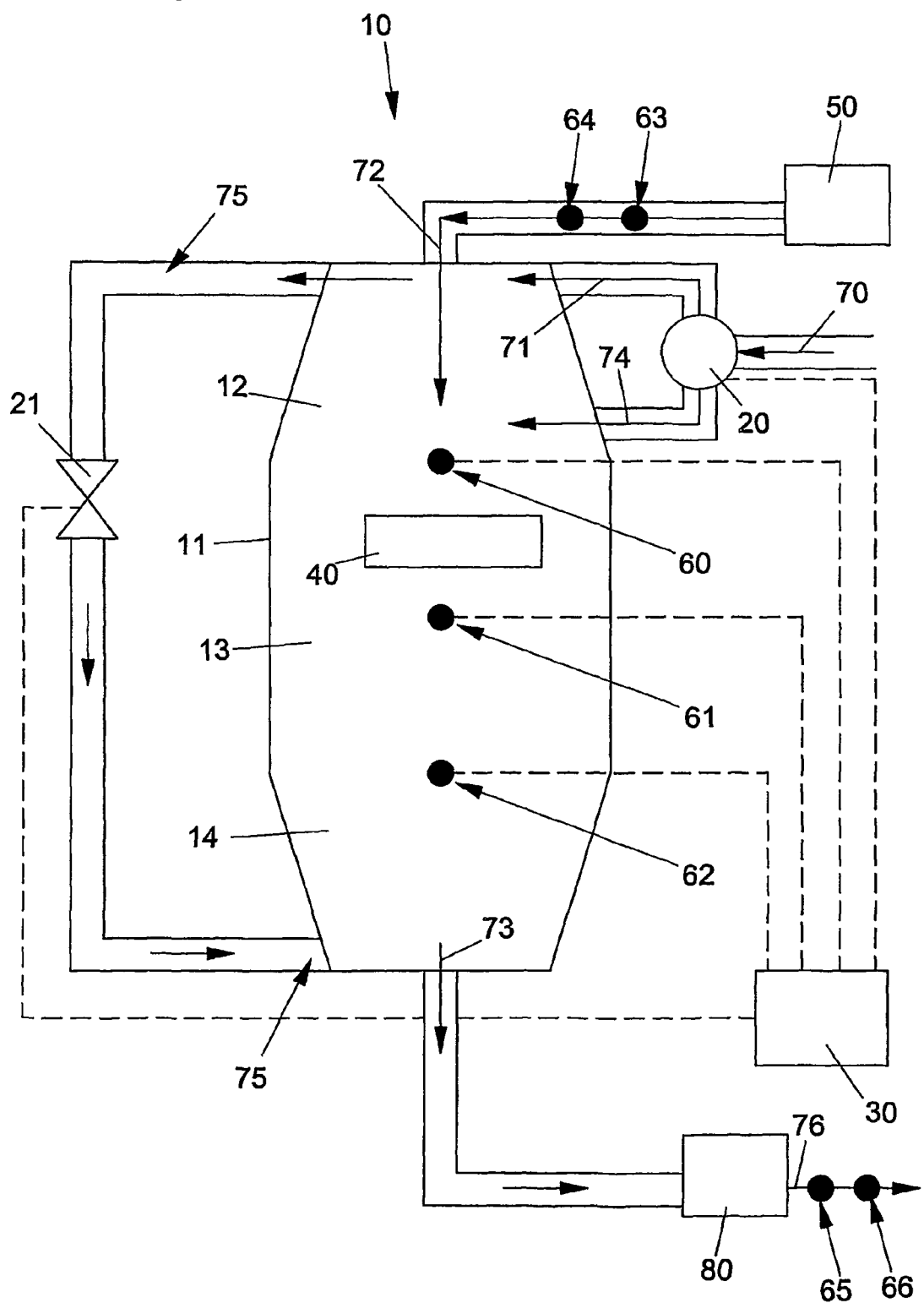
FIG. 1 is a schematic view of a control and regulation system of a combustion apparatus according to the present invention.

With reference to the figure, this illustrates a preferred embodiment of a control and regulation system of a combustion unit 10.

The control and regulation system comprises a signal acquisition device capable of detecting at least one signal which is characteristic of the functioning of the combustion unit 10.

The control and regulation system preferably comprises a first fuel distribution valve 20 and a second air-flow regulation valve 21.

The control and regulation system comprises an electronic unit 30 and a signal acquisition device capable of detecting signals proportional to characteristic functioning parameters of the combustion unit 10.

The electronic unit 30 is connected to the signal acquisition device.

Furthermore, said electronic unit 30 is connected and controls the first valve 20 and the second valve 21.

The control and regulation system also comprises a program associated with said electronic data processing unit 30.

The control and regulation system preferably comprises a data base associated with said electronic data processing unit 30.

Said electronic unit 30 controls the parameters characteristic of the functioning state of the combustion unit 10 and, on the basis of these, regulates the opening of the first valve 20 and the second valve 21.

Said combustion unit 10 includes a combustion chamber 11 in turn comprising a first area 12, a second central area 13 where the catalyst 40 is positioned, and a third area 14.

Said combustion unit 10 preferably comprises a first inlet duct 71 for the fuel, a second inlet duct 72 for the compressed air, an outlet duct 73 for the exhaust gases.

Said combustion unit 10 comprises a third inlet duct 74 for the fuel.

Said combustion unit 10 also comprises a duct 75 which connects a first area 12 and a third area 14 of the combustion chamber 11.

The second valve 21, which regulates the air that flows through it, is positioned on the duct 75.

Said combustion unit 10 is connected to a compressor 50 and a turbine 80.

Said compressor 50 compresses the air, which is then introduced into the second inlet duct 72.

Said turbine 80 receives hot air from the outlet duct 73.

The second inlet duct 72 is connected to the first area 12 of the combustion chamber 11, so that the compressed air coming from the compressor 50 flows into the combustion chamber 11.

The first inlet duct 71 is connected to the combustion chamber to allow the fuel to enter the first area 12, whereas the third inlet duct 74 is connected to the combustion chamber to allow the fuel to enter between the first area 12 and the second area 13.

The first valve 20 receives the fuel from a main duct 70 and distributes it between the first inlet duct 71 and the third inlet duct 74.

The signal acquisition device comprises a series of sensors suitable for detecting signals proportional to parameters characteristic of the functioning state of the combustion unit 10.

This series of sensors comprises a number of temperature sensors situated in the combustion chamber 11.

Said series of temperature sensors comprises a first set of temperature sensors 60, a second set of temperature sensors 61 and a third set of temperature sensors 62.

Said series of sensors also comprises pressure sensors 63 for measuring the pressure of the compressed air coming from the compressor 50, temperature sensors 64 for measuring the temperature of the compressed air leaving the compressor 50, pressure sensors 65 and temperature sensors 66 of the exhaust gases at the outlet 76 of the turbine 80.

The pressure and temperature of the exhaust gases at the outlet of the turbine 80 are detected by means of the pressure sensors 65 and temperature sensors 66, respectively.

The first series of temperature sensors 60 and the second series of temperature sensors 61 are situated close to the catalyst 40.

In particular, the first series of temperature sensors 60 is positioned between the first area 12 and the second area 13 of the combustion chamber 11, whereas the second series of temperature sensors 61 is situated between the second area 13 and third area 14 of the combustion chamber 11.

Most of the compressed air coming from the compressor 50 enters the first area 12 of the combustion chamber 11 through the second inlet duct 72 and is mixed with the fuel introduced into the first inlet duct 71, the remaining part of compressed air passes through the duct 75, re-enters downstream of the area 14 of the combustion chamber 11 and does not take part in the combustion process.

The combustion reaction then takes place, of the fuel with the compressed air, with the consequent heating of the air and fuel mixture. This allows the functioning temperature of the catalyst to be raised.

Fuel coming from the third fuel inlet duct 74 is then added to the mixture thus heated.

The combustion reaction mainly takes place in the second area 13 of the combustion chamber 11 and is completed in the third area 14.

The first series of temperature sensors 60 detects the inlet temperature of the catalyst 40, the second series of temperature sensors 61 detects the intermediate temperature of the catalyst 40, the third series of temperature sensors 62 detects the outlet temperature of the catalyst 40.

The ideal outlet temperature values which should be reached to enable, under certain environmental conditions, the correct functioning of the catalyst 40, are respectively called adiabatic temperature, a function of the objective inlet temperature and objective intermediate temperature (Tad_catinter), adiabatic temperature, a function of the objective inlet temperature and objective outlet temperature (Tad_catout).

The electronic processing unit 30 calculates the Tad_catinter, using the compressed air pressure at the outlet of the compressor 50, the objective intermediate temperature of the catalyst, and the objective inlet temperature of the catalyst.

The electronic processing unit 30 then calculates the Tad_catout, using the compressed air pressure at the outlet of the compressor 50, the objective inlet temperature of the catalyst 40 and the objective outlet temperature of the catalyst 40.

The Tad_catout and Tad_catinter are calculated by fixing for the catalyst inlet temperature, the temperature in the intermediate catalyst phase and catalyst outlet temperature, a pre-established value called objective.

The electronic unit 30 subsequently compares the Tad_catinter value with the Tad_catout value, selecting the minimum value of the two.

This minimum value is the objective adiabatic temperature.

The electronic processing unit 30 then determines, on the basis of the objective adiabatic temperature, the regulation of the second air distribution valve 21 to reach the objective adiabatic temperature.

The position of the second air distribution valve 21 is evaluated by the electronic processing unit 30 by calculating the flow-rate of the air sucked by the compressor 50.

The electronic data processing unit 30 calculates the air flow that enters the combustion chamber 11 using the compressor 50 maps, memorized in the data base.

These maps compare the air flow of the compressor 50 with the measurement of the compression ratio of the compressor 50 at different rates of the turbine measured, and at different positions of the stator blades at the mouth of the compressor 50.

As the fuel flow-rate is known, the control and regulation system then calculates how much flow must be distributed to the second regulation valve 21 in order to obtain the air flow-rate into the combustion chamber, necessary for reaching the adiabatic temperature defined above.

The functioning of the catalyst within the temperature range which guarantees its correct functioning, is obtained through the regulation of the first fuel distribution valve 20 between the first combustion area 12 and the second combustion area 13. The regulation system ensures that the inlet temperature of the catalyst 40 reaches such a value as to guarantee that the temperatures of the catalyst remain within the range which assures its correct functioning.

The electronic unit 30 first calculates the adiabatic temperature estimation on the basis of the measurement of the pressure and temperature supplied by the compressor 50, on the basis of the pressure and temperature measurement at the outlet of the turbine 80, on the basis of the fuel flow-rate and on the basis of the atmospheric temperature value.

On the basis of the adiabatic temperature thus calculated, the measurement of the pressure supplied by the compressor 50 and the temperature value at the intermediate phase of the catalyst 40 which is to be reached, the electronic unit 30 calculates the inlet temperature of the catalyst which guarantees the desired temperature at the intermediate phase of the catalyst 40.

In the same way, in relation to the adiabatic temperature calculated, the pressure supplied by the compressor 50 and the desired outlet temperature of the catalyst, the electronic unit 30 calculates the inlet temperature of the catalyst 40 which guarantees the outlet temperature of the catalyst 40 equal to that to be reached.

The control system compares the inlet temperatures of the catalyst 40 calculated with the maximum tolerable value of the same catalyst 40, the control system then selects the minimum of all temperatures.

Furthermore, the control system compares the temperature thus obtained with the minimum value which enables combustion in the first area 12 of the combustion chamber and then takes the higher of the two.

The inlet temperature of the catalyst 40 thus obtained is that which must be reached through the regulation of the fuel distribution valve so that the temperatures of the catalyst remain within the range which guarantees its correct functioning.

In this way, it is always possible to reduce the CO and NOx emissions of the combustion unit (10) to the minimum, with variations in the environmental conditions, by maintaining the inlet temperature of the catalyst at a pre-established value and contemporaneously limiting the outlet and intermediate temperature of the catalyst 40 so as to increase its useful life.

It can thus be seen that a control and regulation system of a combustion unit according to the present invention achieves the objectives specified above.

Numerous modifications and variants can be applied to the control and regulation system of a combustion unit of the present invention thus conceived, all included within the same inventive concept.

The invention claimed is:

1. A control and regulation system of a combustion unit including a combustion chamber and a catalyst, said control and regulation system comprising:
   an acquisition device configured to acquire signals proportional to functioning parameters characteristic of the functioning state of the combustion unit;
   an electronic data processing unit connected to the signal acquisition device and configured to receive the signals;
   a control and regulation program associated with said electronic data processing unit;
   a first fuel distribution valve configured to fluidly connect to the combustion chamber;
   a second air distribution valve configured
      to fluidly connect a first area of the combustion chamber to a third area of the combustion chamber, and
      to regulate an amount of air flowing to the third area from the first area outside the combustion chamber; and
   a data base associated with said electronic data processing unit, wherein
   said electronic data processing unit receives the signals from the signal acquisition device, processes the signals and, based on the processed signals and the data base, regulates an opening of the first valve and second valve to minimize polluting emissions of CO and NOx of the combustion unit;
   wherein said combustion chamber comprises the first area, a second area in which the catalyst is housed, the third area that sandwiches with the first area the second area, a first fuel inlet duct connecting said first fuel distribution valve to said first area of the combustion chamber, a second inlet duct configured to transport the air coming from a compressor and an outlet duct of the exhaust gases that is connected to the third area of the combustion chamber; and
   wherein said combustion chamber further comprises a third fuel inlet duct configured to connect said first fuel distribution valve to an interface between the second area and the third area of the combustion chamber, an air distribution duct configured to connect the first area of the combustion chamber to the third area of the combustion chamber and to be controlled by the second air distribution valve and a main fuel duct connected to the first fuel distribution valve.

2. The control and regulation system of a combustion unit according to claim 1, wherein said acquisition device comprises at least one sensor configured to detect at least one signal proportional to a functional parameter characteristic of the functioning state of the combustion unit.

3. The control and regulation system of a combustion unit according to claim 1, wherein said acquisition device comprises a series of sensors configured to detect signals proportional to parameters characteristic of the functioning state of the combustion unit.

4. The control and regulation system of a combustion unit according to claim 3, wherein said series of sensors comprises a set of temperature sensors.

5. The control and regulation system of a combustion unit according to claim 1, wherein said acquisition device includes a first set of temperature sensors, a second set of temperature sensors and a third set of temperature sensors.

6. The control and regulation system of a combustion unit according to claim 5, wherein said acquisition device comprises first pressure sensors disposed between a compressor configured to provide air to the combustion chamber and the combustion chamber and second pressure sensors disposed downstream from a turbine connected to the combustion chamber.

7. The control and regulation system of a combustion unit according to claim 5, wherein said acquisition device comprises first temperature sensors disposed between a compressor configured to provide air to the combustion chamber and the combustion chamber and second temperature sensors disposed downstream from a turbine connected to the combustion chamber.

8. The control and regulation system of a combustion unit according to claim 1, wherein the main fuel duct is connected to the first valve which in turn is connected to the first fuel inlet duct and to the third fuel inlet duct to distribute the fuel in the first area and the second area of the combustion chamber.

9. The control and regulation system of a combustion unit according to claim 5, wherein said first set of temperature sensors is positioned between the first area and the second area close to the catalyst.

10. The control and regulation system of a combustion unit according to claim 5, wherein the second set of temperature sensors is positioned close to the catalyst between a second area and the third area of the combustion chamber.

11. The control and regulation system of a combustion unit according to claim 5, wherein the third set of temperature sensors is positioned in the third area of the combustion chamber.

12. The control and regulation system of a combustion unit according to claim 1, wherein said combustion unit is connected to a compressor and a turbine by the second compressed air inlet duct and by the outlet duct, respectively.

13. A control and regulation system of a combustion unit including a combustion chamber and a catalyst, said control and regulation system comprising:

an acquisition device configured to acquire signals proportional to functioning parameters characteristic of the functioning state of the combustion unit;

an electronic data processing unit connected to the signal acquisition device and configured to receive the signals;

a control and regulation program associated with said electronic data processing unit;

a fuel distribution valve configured to fluidly connect to the combustion chamber and regulate an amount of fuel provided to the combustion chamber;

an air distribution valve configured to fluidly connect a first area of the combustion chamber to a third area of the combustion chamber and to regulate an amount of air flowing to the third area from the first area outside the combustion chamber; and a data base associated with said electronic data processing unit, wherein said electronic data processing unit receives the signals from the signal acquisition device, processes the signals and regulates an opening of the fuel distribution valve and the air distribution valve to minimize polluting emissions of CO and NOx of the combustion unit based on the received signals and the data base;

wherein said combustion chamber comprises the first area, a second area in which the catalyst is housed, the third area that sandwiches with the first area the second area, a first fuel inlet duct connecting said first fuel distribution valve to said first area of the combustion chamber, a second inlet duct configured to transport the air coming from a compressor and an outlet duct of the exhaust gases that is connected to the third area of the combustion chamber; and wherein said combustion chamber further comprises a third fuel inlet duct configured to connect said first fuel distribution valve to an interface between the second area and the third area of the combustion chamber, an air distribution duct configured to connect the first area of the combustion chamber to the third area of the combustion chamber and to be controlled by the second air distribution valve and a main fuel duct connected to the first fuel distribution valve.

14. The control and regulation system of a combustion unit according to claim 13, wherein said acquisition device includes a first set of temperature sensors, a second set of temperature sensors and a third set of temperature sensors provided inside the combustion chamber.

15. The control and regulation system of a combustion unit according to claim 14, wherein said acquisition device comprises first pressure sensors disposed between a compressor configured to provide air to the combustion chamber and the combustion chamber and second pressure sensors disposed downstream from a turbine connected to the combustion chamber.

16. The control and regulation system of a combustion unit according to claim 14, wherein said acquisition device comprises first temperature sensors disposed between a compressor configured to provide air to the combustion chamber and the combustion chamber and second temperature sensors disposed downstream from a turbine connected to the combustion chamber.

* * * * *